(12) United States Patent
Keller et al.

(10) Patent No.: US 6,784,270 B1
(45) Date of Patent: *Aug. 31, 2004

(54) POLYMER CONTAINING BORATE AND ALKYNYL GROUPS

(75) Inventors: Teddy M. Keller, Fairfax Station, VA (US); David Y. Son, Dallas, TX (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/255,050

(22) Filed: Sep. 26, 2002

(51) Int. Cl.[7] .................. C08G 79/08; C08G 77/56
(52) U.S. Cl. ................. 528/8; 528/30; 528/32
(58) Field of Search ............... 528/4, 8, 30, 32

(56) References Cited

U.S. PATENT DOCUMENTS

| | | | |
|---|---|---|---|
| 2,431,878 A | | 12/1947 | McGregor et al |
| 2,541,851 A | | 2/1951 | Wright |
| 3,463,801 A | | 8/1969 | Pepetti et al. |
| 3,933,712 A | | 1/1976 | Vanaglash, Jr. |
| 4,139,547 A | | 2/1979 | Berger |
| 4,152,509 A | * | 5/1979 | Yajima et al. ............ 528/4 |
| 4,395,527 A | | 7/1983 | Berger |
| 4,480,009 A | | 10/1984 | Berger |
| 4,499,149 A | | 2/1985 | Berger |
| 4,847,154 A | | 7/1989 | Ryang |
| 4,851,491 A | * | 7/1989 | Riccitiello et al. ......... 528/4 |
| 4,940,767 A | | 7/1990 | Barton et al. |
| 4,965,332 A | | 10/1990 | Barton et al. |
| 5,211,877 A | | 5/1993 | Andrejewski et al. |
| 5,233,006 A | * | 8/1993 | Wolter et al. ............. 528/32 |
| 5,272,237 A | | 12/1993 | Keller et al. |
| 5,292,779 A | | 3/1994 | Keller et al. |
| 5,292,830 A | | 3/1994 | Funayama et al. |
| 5,348,917 A | | 9/1994 | Keller et al. |
| 5,483,017 A | | 1/1996 | Keller et al. |
| 5,559,189 A | | 9/1996 | Dirlikov et al. |
| 5,563,181 A | | 10/1996 | Keller et al. |
| 5,594,075 A | | 1/1997 | Reinhardt et al. |
| 5,644,014 A | * | 7/1997 | Schmidt et al. ........... 528/43 |
| 5,665,845 A | * | 9/1997 | Allman .................. 528/8 |
| 5,681,870 A | | 10/1997 | Keller et al. |
| 5,691,435 A | | 11/1997 | Herzig et al. |
| 5,693,689 A | * | 12/1997 | Gibbon .................. 523/137 |
| 5,721,300 A | | 2/1998 | Knies et al. |
| 5,844,052 A | | 12/1998 | Keller et al. |
| 5,981,678 A | | 11/1999 | Keller et al. |
| 5,986,032 A | | 11/1999 | Keller et al. |
| 6,025,453 A | | 2/2000 | Keller et al. |
| 6,187,426 B1 | * | 2/2001 | Jonschker et al. ........ 428/292.1 |
| 6,225,247 B1 | | 5/2001 | Keller et al. |
| 6,441,086 B1 | * | 8/2002 | Wolfer et al. ............ 524/588 |

* cited by examiner

Primary Examiner—Jeffrey B. Robertson
(74) Attorney, Agent, or Firm—Stephen T. Hunnius; John J. Karasek

(57) ABSTRACT

A polymer has a repeating unit including at least one alkynyl group, at least one borate group, at least one silyl group and/or at least one siloxyl group. The polymer may be prepared by reacting a first compound having at least one alkynyl group and at least one siloxyl group and a second compound selected from boric acid, hydrocarbon borate, hydrocarbon boronic acid, and pyroboric acid. The polymer of the present invention possesses both the processability of an organic polymer and the thermal and oxidative stability of an inorganic polymer.

20 Claims, 2 Drawing Sheets

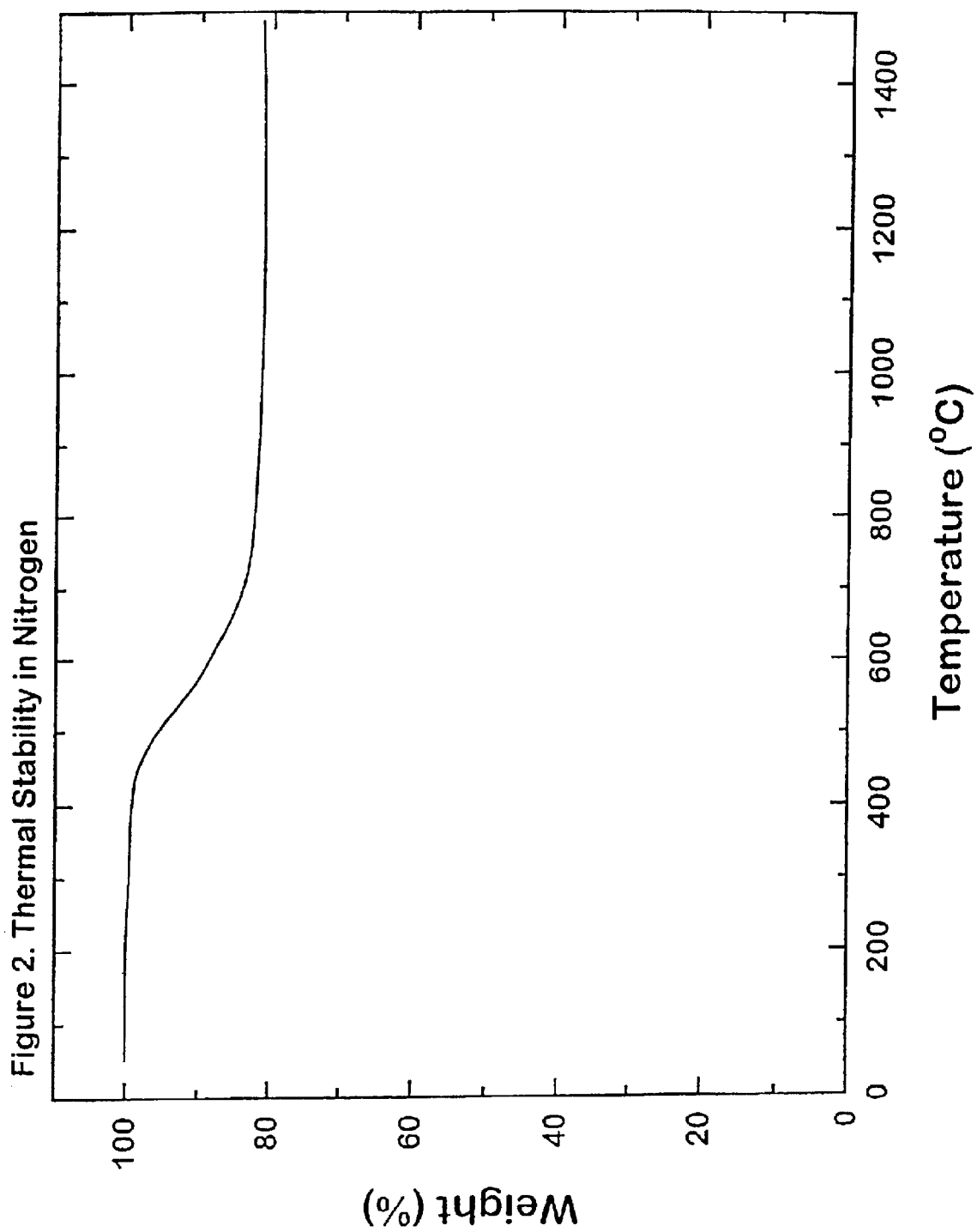

POLYMER CONTAINING BORATE AND ALKYNYL GROUPS

BACKGROUND OF THE INVENTION

1. Field of the Invention

The present invention relates to polymers containing borate groups, alkynyl groups, at least one silyl group and/or at least one siloxyl group.

2. Description of the Related Technology

Thermally stable polymeric elastomers consisting of alternating carborane and siloxane groups are known for both the deca- and penta-carboranes ($HCB_{10}H_{10}CH$ and $HCB_5H_5CH$ respectively). See, for example, U.S. Pat. No. 3,463,801. Some have been produced commercially. However, these materials do not contain alkynyl moieties such as acetylenic groups or any other functional group for crosslinking to produce thermosetting polymers. These poly(carborane-siloxane) elastomers show superior thermal (high chars) and oxidative properties (low weight loss) at elevated temperatures (900° C.) as compared to analogous poly(siloxanes) as monitored by thermogravimetric analysis (TGA).

Silylene or siloxane-acetylene and silylene or siloxane-diacetylene polymers have also been reported. See, for example, U.S. Pat. No. 5,483,017. Good quality fibers can be drawn from the melts of the silylene polymers either thermally or with UV light, but they lack the thermally and oxidatively stable boron-containing units.

Linear inorganic-organic polymers containing acetylenic and either bis(silyl or siloxyl)carboranyl units or a random distribution of both bis(silyl or siloxyl)carboranyl and bis (silyl or siloxy) units have also been described. See, for example, U.S. Pat. No. 5,272,237. However, these polymers contain carborane units in each repeating unit which result in a limited availability and high cost.

Accordingly, it is an objective of certain embodiments of the present invention to provide a polymer having improved thermal stability by incorporating boron into its backbone.

It is another objective of certain embodiments of the present invention to provide a cross-linkable boron-containing polymer.

It is another objective of certain embodiments of the present invention to provide a low cost boron-containing polymer useful for making high-temperature, oxidatively stable thermosets or ceramics.

SUMMARY OF THE INVENTION

In a first aspect, the present invention provides a polymer produced by reacting a first compound having at least one alkynyl group, at least one silyl group and/or at least one siloxyl group with a second compound selected from boric acid, hydrocarbon boronic acid, hydrocarbon borate, boron oxide, and pyroboric acid.

In a second aspect, the present invention provides a method of preparing an organoboron polymer including the step of reacting a first compound having at least one alkynyl group, at least one silyl group and/or at least one siloxyl group with a second compound selected from boric acid, hydrocarbon boronic acid, hydrocarbon borate, boron oxide, and pyroboric acid.

In a third aspect, the present,invention provides a polymer having a repeating unit including, at least one alkynyl group, at least one borate group, at least one silyl group and/or at least one siloxyl group.

BRIEF DESCRIPTION OF THE DRAWINGS

FIG. 2 illustrates a TGA thermogram of a polymer according to the present invention.

DETAILED DESCRIPTION OF THE PREFERRED EMBODIMENT(S)

Figure 1:
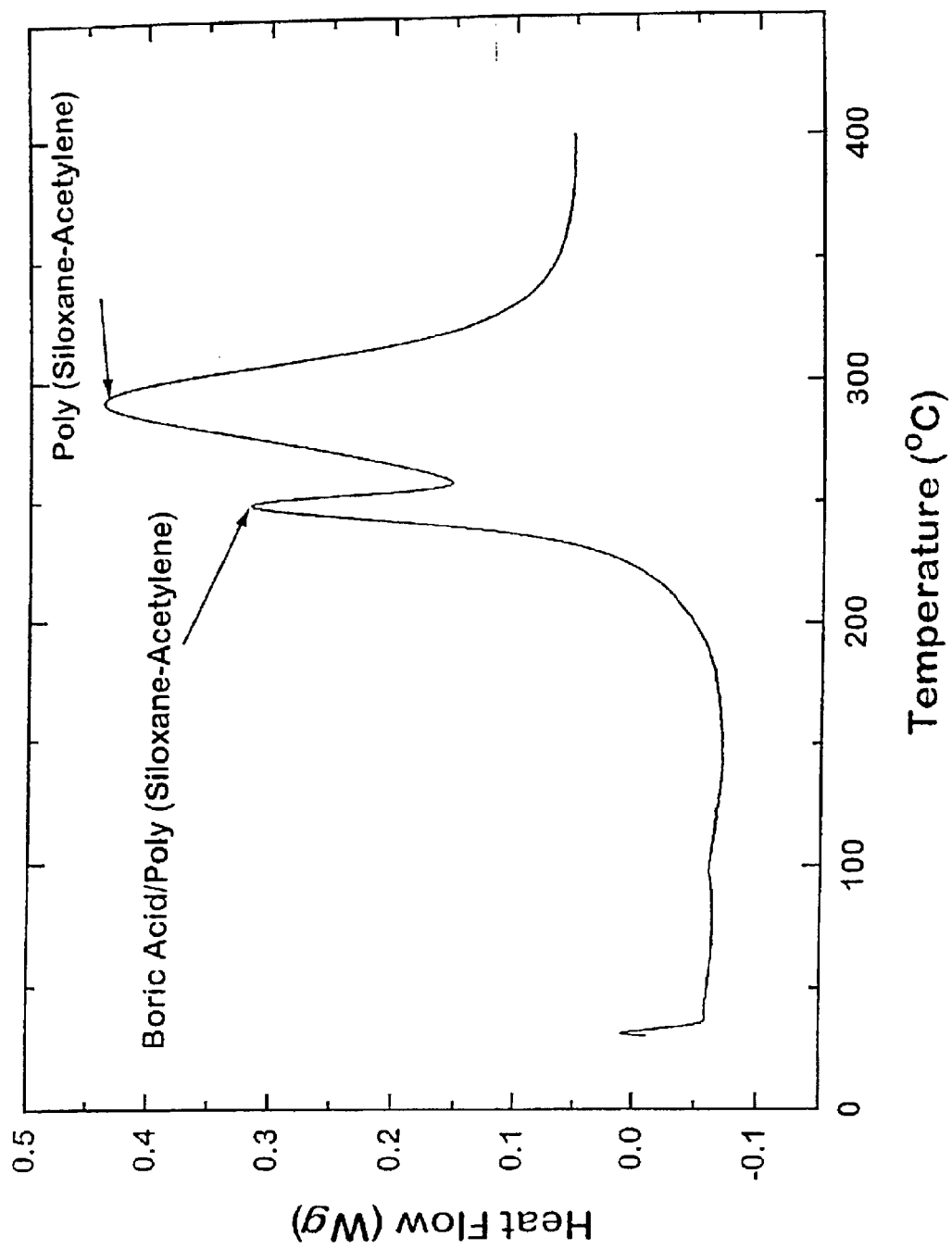
FIG. 1 illustrates a differential scanning calorimetry (DSC) thermogram of a polymer according to the present invention.

In a first aspect, the present invention provides a polymer produced by reacting a first compound having at least one alkynyl group, at least one silyl group and/or at least one siloxyl group and a second compound selected from boric acid, hydrocarbon boronic acid, hydrocarbon borate, and pyroboric acid.

Generally, a siloxyl group is represented by the formula

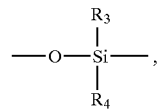

and a silyl group is represented by the formula:

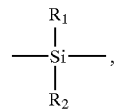

wherein $R_1$, $R_2$, $R_3$ and R4 represent hydrocarbon groups, hydrogen, silyl groups, or siloxyl groups.

An alkynyl group is a group represented by the formula:
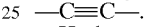
—C≡C—.

Hydrocarbon groups generally refer to branched or straight chain hydrocarbons, which may be unsubstituted hydrocarbon groups, such as alkyl, alkylaryl, arylalkyl and aryl groups, or substituted hydrocarbon groups such as halo-substituted hydrocarbons; hydrocarbons substituted with hybrid rings; hydrocarbons substituted with oxygen, nitrogen, boron, sulfur, silicon and phosphorus; and metal-containing hydrocarbons. In a preferred embodiment, the hydrocarbon groups contain 1 to 20 carbon atoms.

Generally, the polymer of the present invention is produced by reacting a first compound including at least one alkynyl group, at least one silyl group and/or at least one siloxyl group, and a second compound selected from boric acid; hydrocarbon boronic acid such as alkyl boronic acid and aryl boronic acid (i.e., $C_6H_5B(OH)_2$); hydrocarbon borate such as ethyl borate and boron oxide; and pyroboric acid.

In a preferred embodiment, the first compound is a poly(siloxane-acetylene) having the general formula

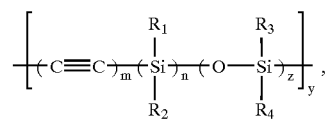

wherein m, n, z, and y are independently selected from positive integers and $R_1$–$R_4$ are hydrocarbon groups. Methods for the preparation of poly(siloxane-acetylene) are generally known to a skilled person in the art. For example, poly(siloxane-acetylene) may be prepared by reacting a salt of an alkyne or a respective Grignard reagent with an alpha, omega-dihalosiloxane. The following scheme illustrates a reaction to produce a poly(siloxane acetylene).

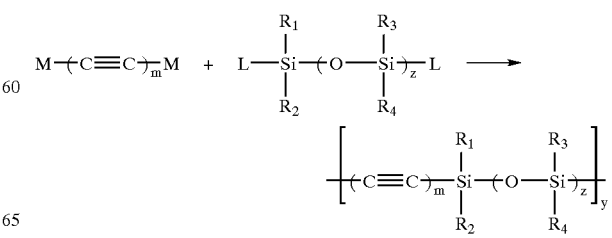

wherein z and y are independently selected from positive integers; $R_1$–$R_4$ are independently selected from a hydrocarbon group, hydrogen, a silane group and a siloxane group; M represents Li, Na, K, Rb, Cs, or MgX, with X being F, Cl, Br, or I; and L represents halogens or other suitable elements. Methods of preparation of the alkyne salt or the respective Grignard reagent are known to a skilled person. Alpha, omega-dihalosiloxane can be purchased from commercial sources such as Aldrich Chemical.

As an example, the synthesis of an exemplary poly (siloxane acetylene) is depicted in the following scheme using specific exemplary compounds.

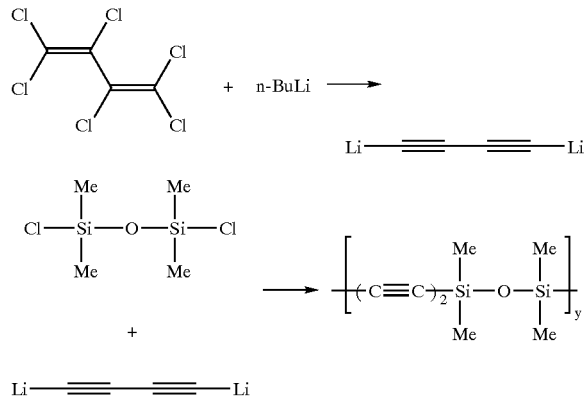

The second compound used in the present invention is preferably a boron-containing compound such as boric acid; hydrocarbon boronic acid such as alkyl boronic acid and aryl boronic acid (i.e., $C_6H_5B(OH)_2$); hydrocarbon borate such as ethyl borate and boron oxide; and pyroboric acid. More preferably, the second compound is boric acid.

In a preferred embodiment, the polymer of the present invention is produced by a process as exemplified in the following scheme:

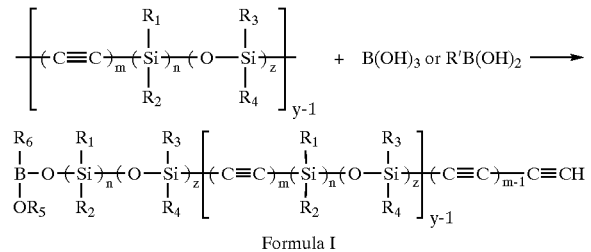

Formula I wherein:
(1) m, n and y are independently selected from positive integers; z is selected from zero or positive integers;
(2) $R_1$, $R_2$, $R_3$, and $R_4$ are independently selected from a hydrocarbon group, hydrogen, a silane group, and a siloxane group;
(3) $R_5$ is a repeating unit of the formula of the poly (siloxane acetylene) and $R_6$ is $OR_5$ or a hydrocarbon group; and
(5) R' is a hydrocarbon group.

In an even more preferred embodiment, the first compound and the second compound are reacted at a suitable ratio between 1:1 and 400:1, respectively, by weight. The reaction may be carried out by combining the first and second compounds and heating them to an elevated temperature. The initial resulting product is a viscous or rubber-like material. More preferably, poly(siloxane-acetylene) and boric acid are reacted at a weight ratio between 5:1 and 10:1, respectively, at a temperature between 100° C. and 150° C. Also preferably m is 2, n is 1 and z is 1.

In another embodiment, boric acid is added to a tetrahydrofuran (THF) solution of poly (siloxane-acetylene), followed by heating the mixture to reflux for 1 to 5 hours. The THF is then removed under reduced pressure leaving a viscous or rubbery composition.

In another aspect, the present invention provides a polymer having a repeating unit including at least one alkynyl group, at least one borate group, at least one silyl group and/or at least one siloxyl group. In a preferred embodiment, the repeating unit of the polymer includes both a silyl group and a siloxyl group.

A borate group is a group represented by the formula:

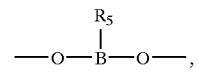

wherein $R_5$ is selected from the group consisting of a hydrocarbon group, —OH, —$OR_6$, wherein $R_6$ is a hydrocarbon group, a siloxane group, or a repeating unit of the formula I.

In a preferred embodiment, the repeating unit of the polymer of the present invention may be represented by formula I:

Formula I

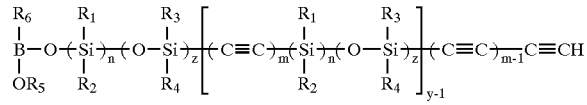

wherein:
(1) m, n and y are independently selected from positive integers; z is selected from zero or positive integers;
(2) $R_1$, $R_2$, $R_3$, and $R_4$ are independently selected from a hydrocarbon group, hydrogen, a silane group, and a siloxane group; and
(3) $R_5$ is a repeating unit of the formula of the poly (siloxane acetylene) and $R_6$ is $OR_5$ or a hydrocarbon group.

More preferably, $R_1$, $R_2$, $R_3$, and $R_4$ are independently selected from the group consisting of a haloalkyl having up to 20 carbon atoms; a haloaryl groups having up to 20 carbon atoms; alkyl, aryl, arylalkyl, and alkylaryl hydrocarbon groups having up to 20 carbon atoms; and hydrogen. Also, preferably, m and n are positive integers and z is 1.

The polymer of the present invention may be a viscous linear or branched polymeric material. Alternatively, by manipulating the ratios or types of reactants and/or the reaction conditions the polymer may be obtained as a crosslinked, rubber-like material. For example, in the above formula, when at least some of the $R_5$ groups are a repeating unit of the formula I, the resulting polymer is a networked material.

Further heating of the rubbery polymer results in crosslinking at least among some of the acetylenic units in the polymer of the present invention to form a thermoset polymer. A DSC thermogram of a polymer of the present invention is illustrated in FIG. 1. FIG. 1 shows two exothermic transitions attributed to the polymer mixture of the present invention. The first exothermic transition (at a lower temperature) can be attributed to the crosslinking reaction among the acetylenic units in the newly formed polymer. The second exothermic transition (at a higher temperature) can be attributed to the crosslinking reaction among the acetylenic units in the unreacted poly(siloxane-acetylene) starting material that is still present in the reaction mixture.

The polymers of the present invention contain at least borate, alkynyl, silyl and/or siloxyl groups in the backbone. One advantage of these polymers is that the combination of borate and silyl and/or siloxyl groups, results in high thermal and oxidative stability at elevated temperatures, while the organic constituents of the polymer provide ease of processability.

The synthesis of the polymers of the present invention may be accomplished by simple one-pot reactions that provide high yields. The nature of this reaction makes it simple to change the chemical makeup of these polymers by varying the molar or weight ratio of the first compound relative to the second compound. Changing the ratio between the first and second compounds may result in variations in molecular weight, branching density, and/or the networking properties of the polymer of the present invention.

Another important way to modify the chemical composition of the polymer is to change the composition of the first compound used to prepare the polymer. For example, using a poly(siloxane-acetylene) with block acetylenic repeating units would result in a polymer with block acetylenic repeating units in its backbone. In another example, the ratio of siloxyl and acetylenic units in the poly(siloxane-acetylene) starting material can be changed to vary the ratio of siloxyl and acetylenic units in the resultant polymer and, thus, modify the physical properties of the resulting polymer. Accordingly, it is possible to tailor the polymer of the present invention according to specific needs.

The polymer of the present invention may be used as a rubbery material for many applications. In addition, the polymer of the present invention can be converted into a plastic or ceramic material upon being heated to an elevated temperature to crosslink (cure) the alkynyl groups in the backbone. The resulting crosslinked product exhibits outstanding long-term thermal and oxidative properties as demonstrated by the TGA thermogram of a crosslinked thermoset polymer according to the present invention as shown in FIG. 2. The polymer can also be cured photochemically or possibly by other radiation, or non-radiation treatment methods.

Polymers produced by combining poly(siloxane-acetylene) and boric acid at weight ratios of 5:1 and 10:1 according to the present invention, respectively, were tested for thermal stability under nitrogen flow up to 1500° C. and resulted in char yields of 77% and 80%, respectively. Further thermal analysis of the chars in air to 1500° C. shows excellent oxidative stability of the cross-linked polymer.

The polymer of present invention and the crosslinked polymeric product derived therefrom by thermal treatment may further find applications in the aerospace program in components of rockets and aircraft engines. The cured and/or uncured polymer can also be used in microelectronic applications. Depending on the formation conditions and the choice of starting materials, these polymers may be soluble in many organic solvents, which enhances their utility in potential structural, microelectronic, and/or nonlinear optical (NLO) applications.

The amounts of boron and/or silicon-containing groups relative to the alkyne groups can be varied by controlling the ratio of the reactants and the composition of the reactants in the synthesis. A suitable combination of reactants can be found to produce a polymer needed for a particular application, which will be a function of the physical properties desired.

Polymers containing silyl and/or siloxyl groups, and borate groups can exhibit electrical conductivity, which can make these polymers useful in the microelectronic industry and as nonlinear optical materials (NLO). Polymers with various electrical and/or optical properties could be easily synthesized by varying the substituents on one or both of the boron and silicon-containing groups.

The polymer of the present invention, and thermoset polymers derived therefrom may be impregnated with additives, fillers and/or fibers to form composites and processed into complex shapes. These composites may be used in numerous different applications, such as serving as components that must withstand exposure to high temperatures.

EXAMPLE 1

Preparation of 1,4-dilithio-1,3-butadiyne

A 50-mL three-necked, round-bottomed flask was equipped with a stir bar, glass stopper, septum, and gas inlet tube. After the flask was flame-dried, THF (5 mL) was injected and the flask was placed in a dry ice/acetone bath. n-BuLi (10.6 mL of a 2.5 M solution, 26.5 mmol) was then added and the mixture was stirred for 5 min. Subsequently, hexachlorobutadiene (0.99 mL, 6.3 mmol) was added dropwise via a syringe. After completion of addition, the cold bath was removed and the mixture was stirred at room temperature for two hours. The resulting dark brown mixture contained 1,4-dilithio-1,3-butadiyne.

EXAMPLE 2

Synthesis of Poly(siloxane-acetylene)

A mixture of 1,4-dilithio-1,3-butadiyne (6.3 mmol) obtained by the process of Example 1, in THF/hexane was cooled in a dry ice/acetone bath. To this mixture, 1,3-dichlorotetramethyldisiloxane (1.24 ml, 6.3 mmol) was added dropwise over 15 min. After the addition, the cold bath was removed and the mixture was stirred at room temperature for two hours. The obtained tan colored mixture was poured into 20 ml of ice cooled saturated aqueous ammonium chloride solution with stirring. The mixture was filtered through a Celite pad and the layers of the filtrate were separated. The aqueous layer was extracted twice with diethyl ether. All of the organic layers including those derived from extraction were combined and the combined organic layers were washed twice with distilled water and once with saturated aqueous NaCl solution. The remaining dark brown organic layer was dried over anhydrous magnesium sulfate and filtered. Most of the volatiles in the organic layer were removed at reduced pressure and the residue was heated at 75° C. for three hours at 0.1 torr to give poly(siloxane-acetylene) as a thick, dark brown material (1.04 g, 92%). The polymer slowly solidified on standing at room temperature and liquefied at approximately 70° C.

EXAMPLE 3

Reaction of Poly(siloxane-acetylene) with 5 Weight Percent of Boric Acid

Poly(siloxane-acetylene) (0.5 g) and boric acid (0.025 g) were weighed into a 25 ml round bottom flask. To the flask was added 5 ml of dry THF and the resulting mixture was refluxed (68° C.) for 8 hrs. The THF was then removed by distillation with complete removal of solvent being accomplished at reduced pressure to afford 0.5 g of product, a polymer of the present invention.

EXAMPLE 4

Reaction of Poly(siloxane-acetylene) with 10 Weight Percent of Boric Acid

Poly(siloxane-acetylene) (5.0 g) and boric acid (0.5 g) were weighed into a 2-necked, 50 ml flask equipped with a thermometer and a reflux condenser. To the flask was added 25 ml of dry THF and the mixture was refluxed for 3 hrs.

under an inert atmosphere. The solvent (THF) was then distilled from the flask leaving as the reaction product (5.5 g), a polymer of the present invention.

EXAMPLE 5
Reaction of Poly(siloxane-acetylene) with 20 Weight Percent of Boric Acid Poly(siloxane-acetylene) (5.0 g) and boric acid (1.0 g) were weighed into a 2-necked, 50 ml flask equipped with a thermometer and a reflux condenser. To the flask was added 25 ml of dry THF and the mixture was refluxed (68° C.) for 3 hrs. under an inert atmosphere. The solvent (THF) was then distilled from the flask leaving as the reaction product (5.9 g), a polymer of the present invention.

EXAMPLE 6
Thermal Conversion of Polymeric Composition from Example 3 to a Thermoset Poly(siloxane-acetylene)/boric acid composition (25.25 mg) prepared by Example 3 was placed on a thermogravimetric analysis (TGA) pan and cured by heating at 100, 200, 300, and 400° C. for 1 hr at each temperature and at 450° C. for 3 hrs under an inert atmosphere resulting in the formation of a hard, glassy thermoset polymer.

EXAMPLE 7
Thermal Conversion of Poly(siloxane-acetylene)/ boric Acid Composition (90/10 Weight Percent) from Example 4 to a Thermoset Poly(siloxane-acetylene)/boric acid composition (23.51 mg) of Example 4 was placed on a thermogravimetric analysis (TGA) pan and cured by heating at 100, 200, 300, and 400° C. for 1 hr at each temperature and at 450° C. for 3 hrs under an inert atmosphere resulting in the formation of a hard, glassy polymeric material.

EXAMPLE 8
Oxidative Aging Study on the Thermoset Polymer from Example 7.

The cured sample from Example 7 was cooled and aged in a flow of air (100 cc/min) at 300, 350, and 400° C. for 4 hrs at each temperature and at 450° C. for 10 hrs resulting in a residue of about 70% of the original weight. During the heat treatment at 300° C., the sample gained about 5.6% of its weight. While heating at 350 and 400° C., the sample lost a total of 2.5% and 8.0%, of its weight, respectively.

EXAMPLE 9
Bulk Thermal Conversion of Poly(siloxane-acetylene)/boric Acid (90/10 Weight Percent) from Example 4.

A sample (1.19 g) of poly(siloxane-acetylene)/boric acid obtained in accordance with Example 4, was weighed into an aluminum planchet. The sample was placed on a hot plate, which was situated inside of a dessicator. The sample was then heated at 110° C. for 1 hr and at 140–160° C. for 1.5 hrs while under full vacuum. During this time, volatiles were evolving from the surface of the melt and the composition was slowly increasing in viscosity. The temperature was further increased to 175° C. for 30 min. resulting in a further enhancement in viscosity. Upon cooling to room temperature, the sample was tacky and gummy. The sample was then placed in an oven and heated to 215° C. for 2 hrs, at 250° C. for 2 hrs, and at 350° C. for 3 hrs to convert the sample to a thermoset polymer.

EXAMPLE 10
Thermal Conversion of Poly(siloxane-acetylene)/ boric Acid Composition (80/20 Weight Percent) from Example 5 to a Thermoset Polymer Poly(siloxane-acetylene)/boric acid composition (30.99 mg) of Example 5 was placed on a thermogravimetric analysis (TGA) pan and cured by heating at 100, 200, 300, and 400° C. for 1 hr at each temperature and at 450° C. for 3 hrs under an inert atmosphere resulting in the formation of a hard, glassy thermoset polymer.

EXAMPLE 11
Oxidative Aging Study on the Thermoset Polymer from Example 10.

The cured sample from Example 10 was cooled and aged in a flow of air (100 cc/min) at 300, 350, and 400° C. for 4 hrs at each temperature and at 450° C. for 10 hrs resulting in a residue of about 76% of the original weight. During the heat treatment at 300° C., the sample gained about 4.6% of its weight. While at 350 and 400° C., the sample lost a total of 3.0% and 7.0% of the original weight, respectively.

EXAMPLE 12
Bulk Thermal Conversion of Poly(siloxane-acetylene)/boric Acid (80/20) Weight Percent) from Example 5.

A sample (1.18 g) of poly(siloxane-acetylene)/boric acid (80/20) obtained by the process of Example 5, was weighed into an aluminum planchet. The sample was placed on a hot plate, which was situated inside of a dessicator. The sample was then heated at 110° C. for 1 hr and at 140–160° C. for 1.5 hrs while under full vacuum. During this time, volatiles were evolving from the surface of the melt and the composition was slowly increasing in viscosity. The temperature was further increased to 175° C. for 30 min. resulting in a further enhancement in viscosity. Upon cooling to room temperature, the sample was tacky and gummy. The sample was then placed in an oven and heated to 215° C. for 2 hrs, at 250° C. for 2 hrs, and at 350° C. for 3 hrs to convert the sample to a thermoset polymer.

It is to be understood that the foregoing detailed description is given merely by way of illustration and that many variations may be made within the principles of the invention to the full extent indicated by the broad general meaning of the terms in which the appended claims are expressed. The scope of the invention is to be determined from the appended claims.

What is claimed is:

1. A polymer produced by reacting a first compound comprising at least one alkynyl group and at least one group selected from silyl groups and siloxyl groups, with a second compound selected from boric acid, hydrocarbon boronic acid, hydrocarbon borate, and pyroboric acid; and
   wherein said first compound comprises at least two repeating units comprising at least one alkynyl group and at least one siloxyl group.

2. A polymer as claimed in claim 1, wherein said first compound is a poly (siloxane-acetylene) and said second compound is boric acid.

3. A polymer as claimed in claim 1, wherein said step of reacting said first compound and said second compound is carried out at a temperature between 100° C. and 150° C.

4. A polymer as claimed in claim 1, wherein said first compound and said second compound are reacted at a weight ratio of between 1:1 and 400:1, respectively.

5. A polymer as claimed in claim 1, wherein said first compound and said second compound are reacted at a weight ratio of between 5:1 and 10:1, respectively.

6. A polymer as claimed in claim 1, wherein said first compound further comprises at least one boron atom.

7. A polymer produced by reacting a first compound comprising at least one alkynyl group and at least one group selected from silyl groups and siloxyl groups, with a second compound selected from boric acid, hydrocarbon boronic acid, hydrocarbon borate, pyroboric acid; and
   wherein said first compound includes a repeating unit comprising at least one alkynyl group, at least one silyl group and at least one siloxyl group.

8. A polymer as claimed in claim 1, wherein said polymer comprises a repeating unit represented by the formula I:

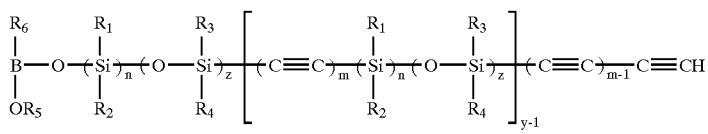

Formula 1 wherein:
(1) m, n and y are independently selected from positive integers; z is selected from zero or positive integers;
(2) $R_1$, $R_2$, $R_3$, and $R_4$ are independently selected from a hydrocarbon group, hydrogen, a silane group, and a siloxane group; and
(3) $R_5$ is a repeating unit of the formula of the poly (siloxane acetylene) and $R_6$ is $OR_5$ or a hydrocarbon group.

9. A polymer as claimed in claim 8, wherein m and n are positive integers, and z is one.

10. A polymer as claimed in claim 8, wherein $R_1$, $R_2$, $R_3$, and $R_4$ are independently selected from the group consisting of:
a haloalkyl group having up to 20 carbon atoms,
a haloaryl group having up to 20 carbon atoms,
an alkyl, aryl, arylalkyl and alkylaryl hydrocarbon group having up to 20 carbon atoms, and hydrogen.

11. A polymer as claimed in claim 8, wherein n is 1.

12. A polymer as claimed in claim 8, wherein m is 2.

13. A polymer as claimed in claim 1, wherein said second compound is phenyl boronic acid.

14. A method of preparing an organoboron polymer comprising the step of reacting a first compound comprising at least one alkynyl group and at least one group selected from a silyl group and a siloxyl group, with a second compound selected from boric acid, hydrocarbon boronic acid, hydrocarbon borate, and pyroboric acid; and
wherein said first compound comprises at least two repeating units comprising at least one alkynyl group and at least one siloxyl group.

15. A method as claimed in claim 14, wherein said first compound is a poly(siloxane-acetylene) and said second compound is boric acid.

16. A method as claimed in claim 14, wherein said step of reacting said first compound and said second compound is carried out at a temperature between 100° C. and 150° C.

17. A method as claimed in claim 14, wherein said first compound and said second compound are reacted at a weight ratio of between 1:1 and 400:1, respectively.

18. A method as claimed in claim 14, wherein said first compound and said second compound are reacted at a weight ratio of between 5:1 and 10:1, respectively.

19. A method as claimed in claim 14, wherein said first compound further includes at least one silyl group.

20. A polymer having a repeating unit comprising at least one siloxyl group, at least one alkynyl group and at least one borate group, further comprising at least one silyl group.

* * * * *